Feb. 22, 1966  E. C. FREBER  3,236,114
TRANSMISSION FOR MINIATURE RACING AUTOMOBILES
Filed March 25, 1963  3 Sheets-Sheet 1
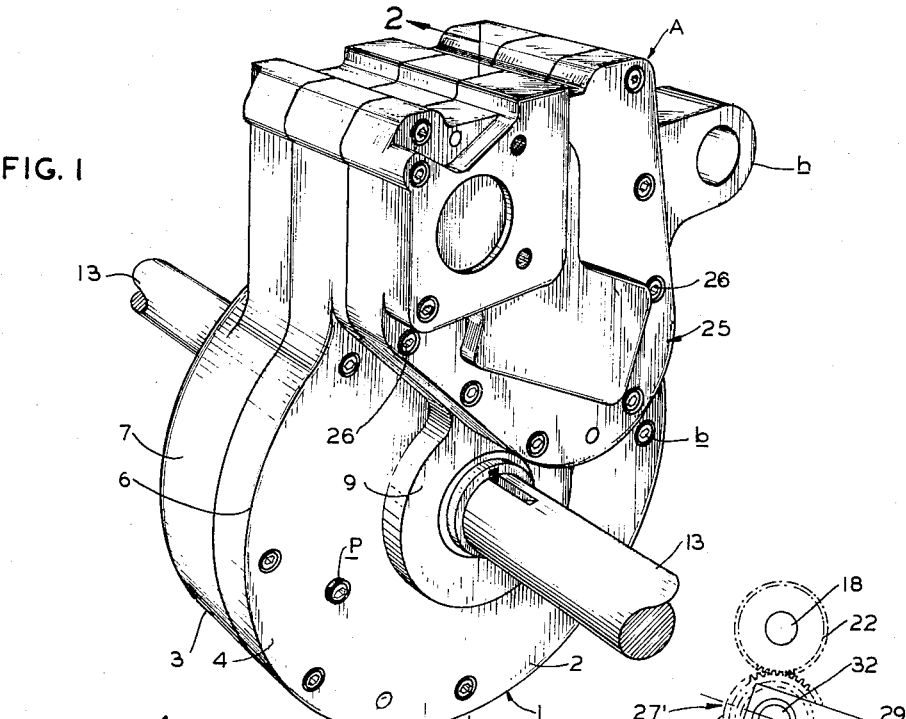
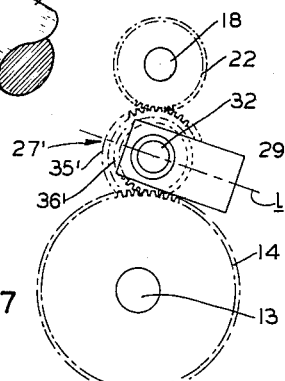
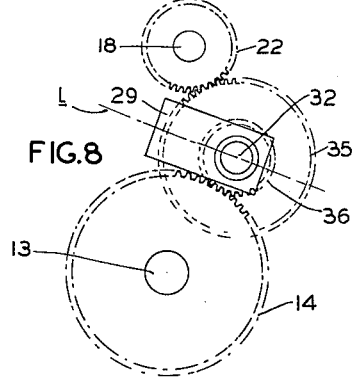
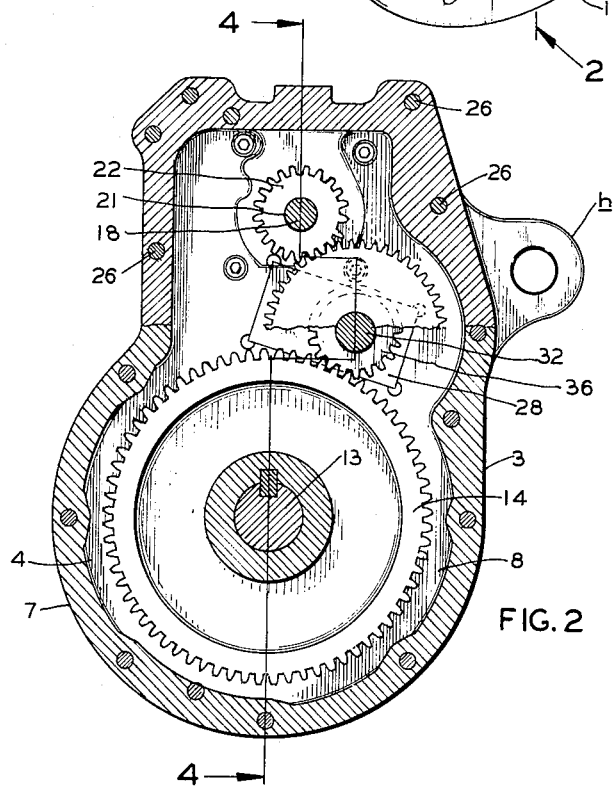
INVENTOR.
ELMER C. FREBER
BY
ATTORNEY Feb. 22, 1966  E. C. FREBER  3,236,114
TRANSMISSION FOR MINIATURE RACING AUTOMOBILES
Filed March 25, 1963  3 Sheets-Sheet 2
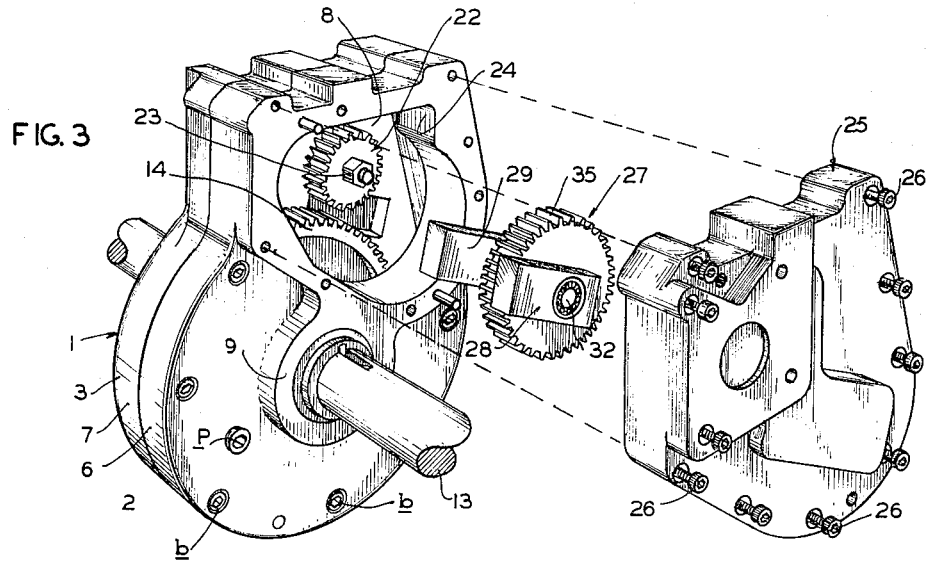
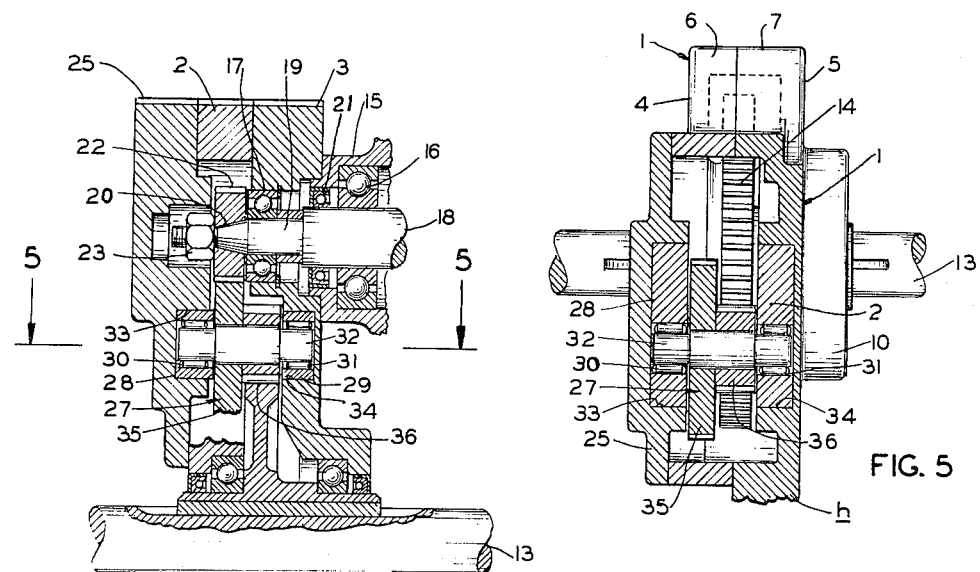
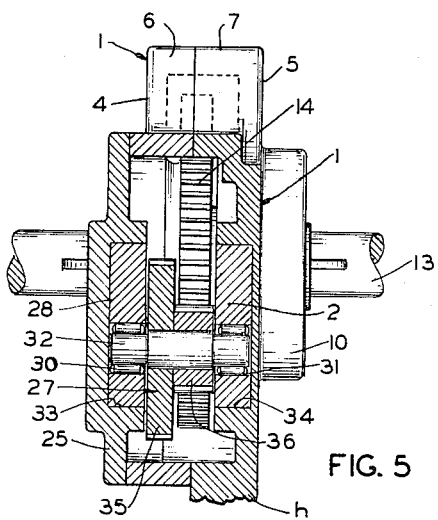
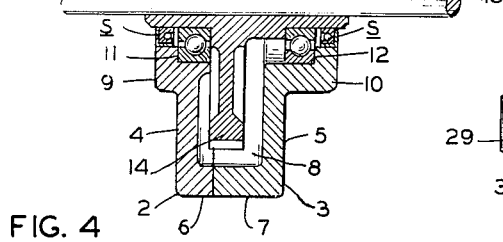
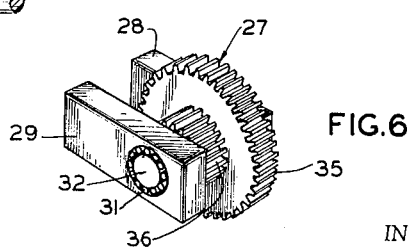
INVENTOR.
ELMER C. FREBER
BY
ATTORNEY Feb. 22, 1966  E. C. FREBER  3,236,114
TRANSMISSION FOR MINIATURE RACING AUTOMOBILES
Filed March 25, 1963  3 Sheets-Sheet 3

INVENTOR.
ELMER C. FREBER
BY
ATTORNEY

United States Patent Office 3,236,114
Patented Feb. 22, 1966

3,236,114
TRANSMISSION FOR MINIATURE RACING AUTOMOBILES
Elmer C. Freber, St. Louis, Mo., assignor to Marquette Tool & Die Co., a corporation of Missouri
Filed Mar. 25, 1963, Ser. No. 267,657
11 Claims. (Cl. 74—325)

This invention relates in general to certain new and useful improvements in transmissions and, more particularly, to a transmission for miniature automobiles having interchangeable gear trains.

In the past few years, the driving of miniature automobiles, or so-called "go-carts" has increased rapidly. In fact, races between such vehicles has become a popular spectator-sport for both amateurs and professionals. These miniature racing automobiles are generally four-wheeled vehicles which resemble a tiny automobile having a chassis constructed in a skeletonized fashion and carrying a steering mechanism, four wheels, a seat, and a power plant. On miniature automobiles used for racing, the power plant is usually a small two-cycle or four-cycle gasoline engine of the type generally found on power mowers and similar types of powered equipment.

At the present time, the sport has become quite sophisticated and various race tracks and racing leagues have been formed for the competitive racing of these miniature racing automobiles. However, the rules and requirements pertaining to the miniature racing automobiles or so-called "racing carts" have not been standardized and will often vary between different leagues and racing tracks. Many of the tracks require a specified power-ratio between the engine of the vehicle and the driving wheels. In some cases, a track will specify different power-ratios which may be required for different races. It is, therefore, desirable for the owner of the miniature racing automobile to have a transmission which will afford the desired power-ratio for each of the various situations which may be encountered.

Moreover, it is often desirable to maintain an established power-ratio according to the condition of each track in instances where the track does not provide for a set power-ratio. For example, the miniature racing automobile owner would provide a large power-ratio to maintain a high degree of torque or power at the driving wheels where the track has a number of curves requiring continual changes in the speed of the racing automobile. On tracks where there are long straightaways, and less turns, the miniature racing automobile owner would desire a low power-ratio between the engine and the driving wheel in order to maintain a high speed at the driving wheels. On such race tracks, the rules often permit the owner of the racing automobile to choose any power-ratio that he desires and it, therefore, becomes desirable to be able to change power-ratio.

In addition to this, it is obviously desirable for a racing automobile to be as fast as possible and, therefore, it is essential to use as high a power-ratio as circumstances will permit. However, since the engine is usually directly coupled to the driving axle, through a gear train, it becomes rather difficult to start the engine. Racing carts are not ordinarily provided wtih conventional automatic starters and, therefore, it is necessary to push the cart so that the wheels will turn the rear axle which will, in turn, cause the engine to start.

It is, therefore, the common practice for each of the drivers to have two or three mechanics push the automobile at the start of a race. According to the rules of most tracks, it is permissible to interpose some clutch between the driving axle and the engine for use in starting.

It is, therefore, the primary object of the present invention to provide a transmission for miniature racing automobiles which is provided with interchangeable change-gear assemblies.

It is another object of the present invention to provide a transmission wherein a second engine can be quickly installed or removed by the use of interchangeable motor mounting cover plates.

It is also an object of the present invention to provide a transmission of the type stated in which one change-gear assembly can be removed and another installed with a minimum amount of mechanical effort and in a minimum amount of time.

It is another object of the present invention to provide a transmission of the type stated which can be adjusted to maintain almost any given power-ratio between the engine and the driving axle within a wide range of power-ratios.

It is an additional object of the present invention to provide a transmission of the type stated which is light in weight, efficient in operation, and relatively inexpensive to manufacture.

It is another salient object of the present invention to provide a transmission of the type stated which is provided with a built-in clutch assembly for momentarily disengaging the driving axle from the engine of the miniature racing automobile in which installed.

With the above and other objects in view, my invention resides in the novel features of form, construction, arrangement, and combination of parts presently described and pointed out in the claims.

In the accompanying drawings:

FIG. 1 is a perspective view of a transmission constructed in accordance with and embodying the present invention;

FIG. 2 is a vertical sectional view taken along line 2—2 of FIG. 1;

FIG. 3 is an exploded perspective view of the transmission showing the cover plate and change-gear removed;

FIG. 4 is a vertical sectional view taken along line 4—4 of FIG. 2;

FIG. 5 is a horizontal sectional view taken along line 5—5 of FIG. 4;

FIG. 6 is a perspective view of the change-gear assembly forming part of the present invention;

FIGS. 7 and 8 are diagrammatic views showing the centerline positions of the various gears and the transmission when combined with the change-gear assembly;

Figure 9:
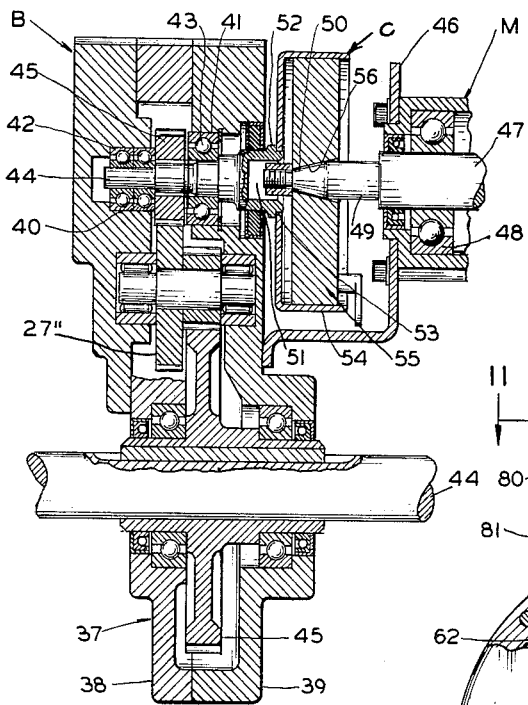
FIG. 9 is a sectional view of a modified form of transmission and showing a clutch mechanism incorporated therein.

Generally speaking, the transmission of the present invention includes an outer housing which can be conventionally bolted or secured to the frame of a miniature racing automobile. The housing is provided with a removable cover plate providing convenient access to the interior portions thereof. The transmission is interiorly provided with a pinion gear mounted on a driven shaft which is conventionally connected to a small two-cycle or four-cycle gasoline engine. The housing is also interiorly provided with a drive gear which is adapted to be operatively connected to the driving axle of the miniature racing automobile.

Provided for insertion in the housing in operative relation between the pinion gear and the drive gear is a removable gear-train or change-gear assembly. The gear-train of the present invention generally consists of a spur gear which is mounted on an idler shaft, the shaft, in turn, being journaled in a pair of bearing blocks. The bearing blocks are designed to fit within cavities formed within the end walls of the housing and thereby hold the spur gear in operative meshing relation with the pinion gear. Also mounted on the idler shaft is an intermediate gear which meshes with the drive gear and thereby rotates the drive shaft. It can be seen that the idler shaft of the removable gear-train can be mounted in a plurality of offset positions with respect to the drive shaft, so that gear-trains having various sized intermediate gears may be used.

A second embodiment of the present invention includes a conventional clutch mechanism which is mounted externally on the transmission housing and provides optional engagement between the crank shaft of the motor and the driven shaft of the transmission. A third embodiment of the present invention includes a transmission which is capable of being driven by a pair of gasoline engines. Oftentimes, the miniature racing automobiles are powered by a pair of power plants, each of which is mounted in close proximity to the driving wheels. The third embodiment, therefore, provides a removable cap which can be removed from the housing and the drive shaft of the second motor connected to the gear-train.

Referring now in more detail and by reference characters to the drawings, which illustrate practical embodiments of the present invention, A designates a transmission for use in miniature racing automobiles and comprises an outer housing 1 which is vertically divided into a front section 2 and a rear section 3, reference being made to FIG. 1, and held in assembled relation by a plurality of bolts b. A mounting hub h is integrally formed with and extends laterally from the front section 2 for convenient attachment to the frame of a miniature racing automobile (not shown).

The front section 2 and rear section 3 are provided with end walls 4, 5, each of which integrally merges into annular side walls 6, 7, respectively. Together, the front and rear sections 2, 3, when in the assembled relation, form an internal compartment 8. The end walls 4, 5, are integrally formed with axially aligned bosses 9, 10, for retaining bearings 11, 12, respectively. Journaled in and extending axially through the bearings 11, 12, is a drive shaft 13 which is ultimately connected to the driving wheels of a miniature racing automobile (not shown). Keyed or otherwise rigidly secured to the shaft 13 is a relatively large diameter driving pinion 14.

The rear section 3 is recessed on its exterior face to snugly accommodate a hub 15 forming part of a two or four cycle gasoline driven engine (not shown). The hub 15 is internally bored to accommodate main bearings 16, and the rear section 3 is apertured to accommodate ball bearings 17 for journaling a crank shaft 18 which forms part of the two or four cycle gasoline driven engine. The shaft 18 is provided with a diametrally reduced portion 19 which is journaled in the ball bearings 17 and includes an integrally formed tapered forward end 20. A neoprene rubber seal 21 is preferably mounted on the crank shaft 18 to prevent oil from the engine from seeping into the compartment 8. Rigidly mounted on the tapered end 20 is a driven pinion 22 which has a tapered central aperture for accommodating the tapered end of the shaft 18 and which is retained by means of a nut 23 on the threaded tapered end of the shaft 18. The front wall 2 is provided with a relatively large opening 24 providing access to the interior of the housing 1. Removably secured to the exterior surface of the front wall 2 in overlying relation upon the opening 24 is a cover plate 25 which is removably secured by means of bolts 26.

Provided for removable insertion into the housing 1 and being adapted for operative engagement with the driven pinion 22 and the driving pinion 14 is any one of a selected number of removable gear-trains or change-gear assemblies 27. The change-gear assemblies 27 include a pair of bearing blocks 28, 29, which are suitably apertured to accommodate needle bearings 30, 31, for journaling an idler shaft 32. The bearing blocks 28, 29, are suitably sized to snugly fit within rectangular box-like recesses 33, 34, formed on the interior surfaces of the rear wall 3 and the cover plate 25, respectively. Rigidly mounted on the shaft 32 is a spur gear 35 which meshes with the driven pinion 22 and thereby rotates the idler shaft 32. Also mounted on the idler shaft 32 is an intermediate pinion gear 36 which meshes with the driving pinion 14 and thereby rotates the same. Thus, it can be seen that as power is transmitted to the crank shaft 18, it will rotate the driven pinion 22 and, hence, the spur gear 35. This will, in turn, cause rotation of the idler shaft 32 and the intermediate pinion gear 36 which will cause rotation of the driving pinion 14 and the drive shaft 13.

It can be seen that the gear-trains 27 can be removed from the interior portion of the housing 1 merely by loosening the bolts 26 and removing the cover plate 25. The bearing blocks 28, 29, are sized to fit snugly, but, nevertheless, removably within the rectangular recesses 33, 34.

By reference to FIGS. 6 and 7, it can be seen that any one of a large number of change-gear assemblies 27 can be inserted within the housing 1 to provide different power-ratios. For example, FIG. 6 depicts a change-gear assembly 27 with the fairly large spur gear 35 mounted on the idler shaft 32 and meshing with the driven pinion 22. Further reference to FIG. 6 shows that the relatively small pinion gear 36 meshing with the enlarged driving pinion 14 provides a relatively large power-ratio and low speed.

Referring now to FIG. 7, it can be seen that a gear-train 27' with a much smaller spur gear 35' is provided for meshing engagement with the driven pinion 22. Also, the change-gear assembly 27' includes an intermediate pinion gear 36' which meshes with the driving gear 14. By reference to FIG. 5, it can be seen that the needle bearings 30, 31, are offset from the center of the bearing blocks 28, 29. Thus, it can be seen that the transmission A is designed to accommodate a large number of removable change gear assemblies 27. For example, with a change-gear assembly 27 having a relatively large spur gear 35, it can be seen that the needle bearings 30, 31, are mounted near one end of the bearing blocks 28, 29. However, for change-gear assemblies 27' which have relatively small spur gears 35', the needle bearings 30, 31, are close to the other end wall of the bearing blocks 28, 29, as shown in FIG. 7. Of course, it should be understood that almost any sized spur gear within these two elements can be used within the transmission A, merely by inserting bearing blocks having varied locations for retaining the bearings. It should also be noted that each of the idler shafts used in connection with the present invention will have their central axes lying within a single plane 1 passing through the central axis of each idler shaft 32.

The front section 4 is provided with an oil plug p for injecting lubricating oil into the compartment 8. It should be noted at this point that neoprene rubber seals s are mounted in the bosses 9, 10 for providing a liquid tight seal around the drive shaft 13.

It is possible to provide a modified form of transmission B as shown in FIG. 9, which is substantially identical to the previously described transmission A. The transmission B includes all of the components of the transmission A except that it is provided with a disengageable clutch C.

The transmission B includes an outer housing 37 having a front section 38 and a rear section 39, reference being made to FIG. 9, and which are substantially identical to the previously described front and rear sections 2, 3, respectively. The front and rear sections 38, 39, are internally bored in the provision of bearing retaining sockets 40, 41. Disposed within the bearing retaining socket 40 are radial bearings 42 and disposed within the bearing retaining socket 41 are thrust bearings 43 for journaling the reduced end of a crank shaft 44. Mounted on the shaft 44 is a spur gear 45 which is substantially identical to the previously described spur gear 35 and, in like manner, meshes with a removable change-gear assembly 27″.

Welded or otherwise rigidly secured to the exterior surface of the rear section 39 is a bracket 46 which is rigidly secured to the block of a motor M. The motor M includes a crank shaft 47 which is journaled in main bearings 48, retained by the motor M. The crank shaft 47 is integrally formed with a reducing forwardly extending portion 49 which is provided with a tapered forward end 50, the latter being retained within an enlarged socket 51 formed within the end of the driven shaft 44, all as can best be seen in FIG. 8. The driven shaft 44 is integrally formed at its rear end with an annular flange 52 thereby forming an annular lip 53 for holding a clutch housing 54. Disposed within the clutch housing 54 and being operatively mounted on the tapered end 50 is a conventional centrifugally operated clutch mechanism 55 which is provided with a tapered bore 56 for mounting on the extended end portion 49 of the crank shaft 47. The clutch mechanism 55 is conventional and, therefore, it is neither illustrated nor described in detail herein.

The clutch mechanism 55 being of the centrifugally operated type will slip at low and "idle" speeds and will cause disengagement between the crank shaft 47 and the driven shaft 44. However, when the clutch mechanism 55 is held in its locked position, as shown in FIG. 9, which is maintained at high engine speeds, engagement is retained between the crank shaft 47 and the driven shaft 44. Rotation of the driven shaft 44 will rotate the spur gear 45. The operation of the transmission B is substantially similar in all other respects to the transmission A.

Figure 10:
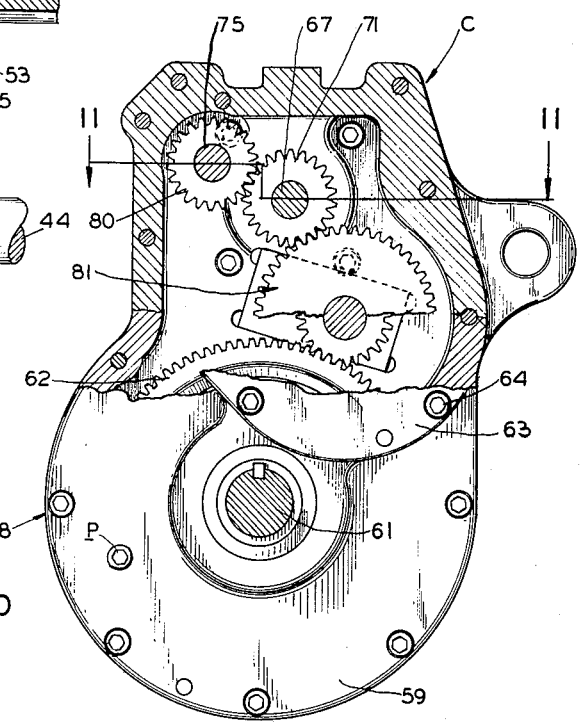
FIG. 10 is an elevational view partly broken away and in section of another modified form of transmission.
Figure 11:
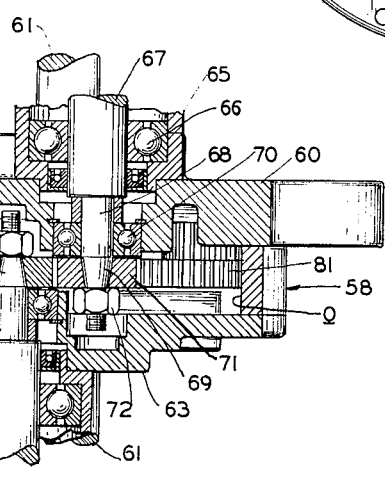
FIG. 11 is a sectional view taken along line 11—11 of FIG. 10.

It is possible to provide another modified form of transmission C substantially as shown in FIGS. 10 and 11, and which is substantially similar to the previously described transmission A. The transmission C includes an outer housing 58 having a front section 59 and a rear section 60, reference being made to FIG. 11, and which are substantially identical to the previously described front and rear sections 2, 3, respectively. The transmission C includes a drive shaft 61 which is provided with a driving pinion 62, all mounted in the manner as the driving shaft 13 and driving pinion 14 are mounted in the transmission A.

The front section 59 is provided with a relatively large aperture o providing access to the interior of the housing 58 and a cover plate 63 is disposed over the aperture o and is removably secured to the exterior surface of the front section 59 by means of bolts 64. The rear section 60 is recessed to accommodate the hub 65 of a conventional gasoline motor (not shown). The hub 65 is snugly fitted within the recess of the rear section 60 and is internally bored to accommodate main bearings 66. The two or four cycle gasoline driven engine is provided with a crank shaft 67 which is journaled within the bearings 66 and extends into the housing 58 in the manner as shown in FIG. 11. The shaft 67 is provided with a diametrally reduced portion 68 which includes an integrally formed tapered forward end 69, the reduced portion 68 being journaled in ball bearings 70. Rigidly mounted on the tapered end 69 is a driven pinion 71 which has a tapered central aperture for accommodating the tapered end of the shaft 67 and which is retained by means of a nut 72 on the threaded end of the shaft 67.

The cover plate 63 is bored on its exterior surface to accommodate the hub 73 of a second gasoline engine (not shown), which is provided with main bearings 74 for journaling a crank shaft 75. The crank shaft 75 is provided with a reduced end 76 which extends into the housing 58 and is provided with a tapered forward end 77. The reduced end 76 is journaled within ball bearings 78 which are mounted within the cover plate 63, as shown in FIG. 11. Rigidly mounted on the tapered end 77 and retained thereon by means of a nut 79 is a driven pinion 80 which meshes with the driven pinion 71.

Provided for removable insertion into the housing 58 and being adapted for operative engagement with the driven pinion 71 is a removable gear-train or change-gear assembly 81 which is substantially identical to the previously described gear-train 27. Therefore, it can be seen that the transmission C is operative in the same manner as the transmission B except that the driving pinion 62 is powered through two driven pinions 71, 80. Since both of the gasoline engines (not shown) are operated at maximum speed, both of the driven pinions 71, 80, are rotated at the same speed and provide twice the power to the driving pinion 62.

The operation of the transmission C is similar in all other respects to the transmission A.

It should be understood that changes and modifications in the form, construction, arrangement, and combination of the several parts of the transmission for miniature racing automobiles may be made and substituted for those herein shown and described without departing from the nature and principle of my invention.

Having thus described my invention, what I claim and desire to secure by Letters Patent is:

1. A transmission comprising an outer housing, a driven shaft rotatably mounted within the housing, first gear means mounted on said driven shaft, a driving shaft rotatably mounted within the housing, second gear means mounted on said driving shaft, said housing having a pair of opposed parallel rectilinear recesses, a pair of rectilinear blocks sized for snug-fitting removable disposition in said recesses, an idler shaft journaled in and extending between said blocks, and gear means mounted on said idler shaft and being interposed between said first and second gear means for transmitting power therebetween.

2. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member being provided on its interior face with a first rectilinear recess and said housing being similarly provided on its interior face with a second rectilinear recess, the latter being in lateral alignment with and parallel to the first recess, a first rectilinear block sized for snug-fitting removable disposition in the first recess, a second rectilinear block sized for snug-fitting removable disposition in the second recess, an idler shaft journaled in and extending between said blocks and gear means mounted on said idler shaft and being interposed between said first and second gear means for transmitting power therebetween.

3. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, and interchangeable connecting gear means operatively supported in said opposed recesses and operatively interposed between said first and second gear means for transmitting power between said driven shaft and said driving shaft.

4. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, interchangeable connecting gear means operatively supported in said opposed recesses and operatively interposed between said first and second gear means for transmitting power between said driven shaft and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said first and second gear means.

5. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, interchangeable connecting gear means operatively supported in said opposed recesses and operatively interposed between said first and second gear means for transmitting power between said driven shaft and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said first and second gear means.

6. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, interchangeable connecting gear means operatively supported in said opposed recesses and operatively interposed between said first and second gear means for transmitting power between said driven shaft and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said first and second gear means.

7. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, interchangeable connecting gear means operatively supported in said opposed recesses and operatively interposed between said first and second gear means for transmitting power between said driven shift and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said first and second gear means.

8. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said cover member and housing being provided with opposed recesses on their interior walls, interchangeable connecting gear means operatively supported in said opposed recesses and operatively interposed between said first and second gear means for transmitting power between said driven shaft and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said first and second gear means.

9. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over and being removably secured to said housing, said cover member and housing being provided with opposed recesses on their interior walls, interchangeable connecting gear means operatively supported in said opposed recesses and operatively interposed between said first and second gear means for transmitting power between said driven shaft and said driving shaft, and clutch means operatively mounted on said driven shaft for optionally preventing power transference between the driven shaft and the driving shaft.

10. A transmission comprising an outer housing, a first driven shaft rotataby mounted within the housing, first gear means mounted on said first driven shaft, a second driven shaft rotatably mounted within the housing, second gear means mounted on said second driven shaft and being in operative engagement with said first gear means, a driving shaft rotatably mounted within the housing, third gear means mounted on said driving shaft, and change gear assembly provided for removable interposition between said second and third gear means for transmitting power therebetween.

11. A transmission comprising an outer housing, a first driven shaft rotatably mounted within the housing, first gear means mounted on said first driven shaft, a second driven shaft rotatably mounted within the housing, second gear means mounted on said second driven shaft and being in operative engagement with said first gear means, a driving shaft rotatably mounted within the housing, third gear means mounted on said driving shaft, said housing having an aperture providing access to the interior portion thereof, a cover member disposed over said aperture and being removably secured to said housing, said cover member and said housing being provided with opposed recesses on their interior walls, interchangeable gear connecting means operatively supported in said opposed recesses and operatively interposed between said first and second gear means for transmitting power between said driven shafts and said driving shaft, said connecting gear means consisting of a pair of support elements which are provided for removable insertion in said opposed recesses, a rotatable shaft extending between said support elements, and a plurality of power transference gears mounted on said rotatable shaft and meshing with said second and third gear means.

References Cited by the Examiner

UNITED STATES PATENTS

| | | | |
|---|---|---|---|
| 1,462,675 | 7/1923 | Whittington | 74—325 |
| 1,919,512 | 7/1933 | Helgeby et al. | 74—325 |
| 2,237,466 | 4/1941 | Zimmerman | 74—325 |
| 2,436,746 | 2/1948 | Drought | 74—325 |
| 2,585,218 | 2/1952 | Borngraeber | 74—325 |

DON A. WAITE, *Primary Examiner.*